Sept. 24, 1968 L. M. DAVIS 3,402,501
FISHING LINE DISPLAY AND DISPENSER
Filed June 28, 1966 2 Sheets-Sheet 1
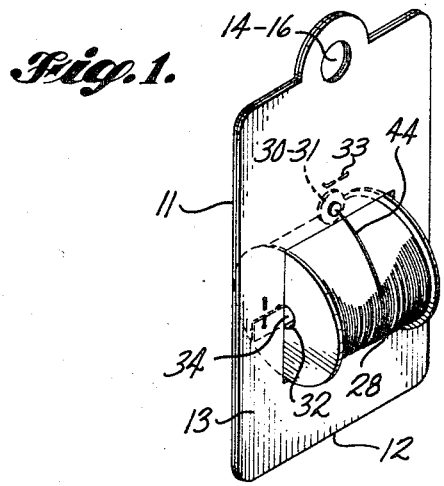
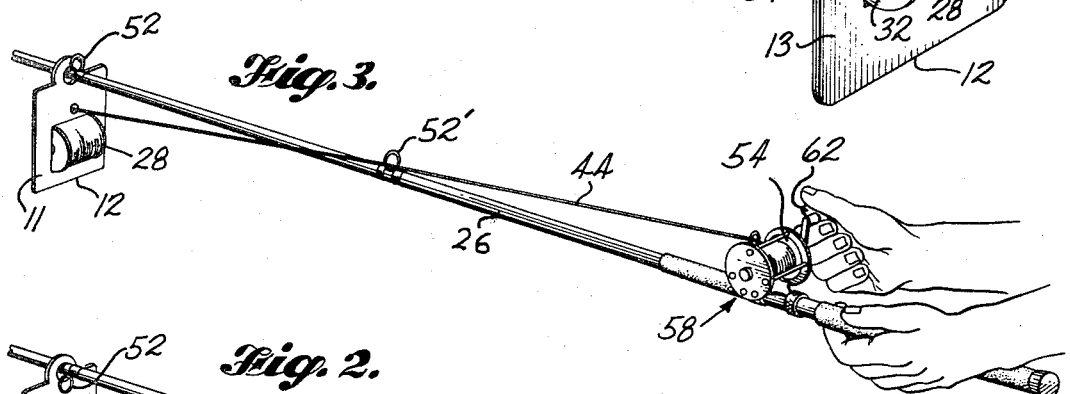
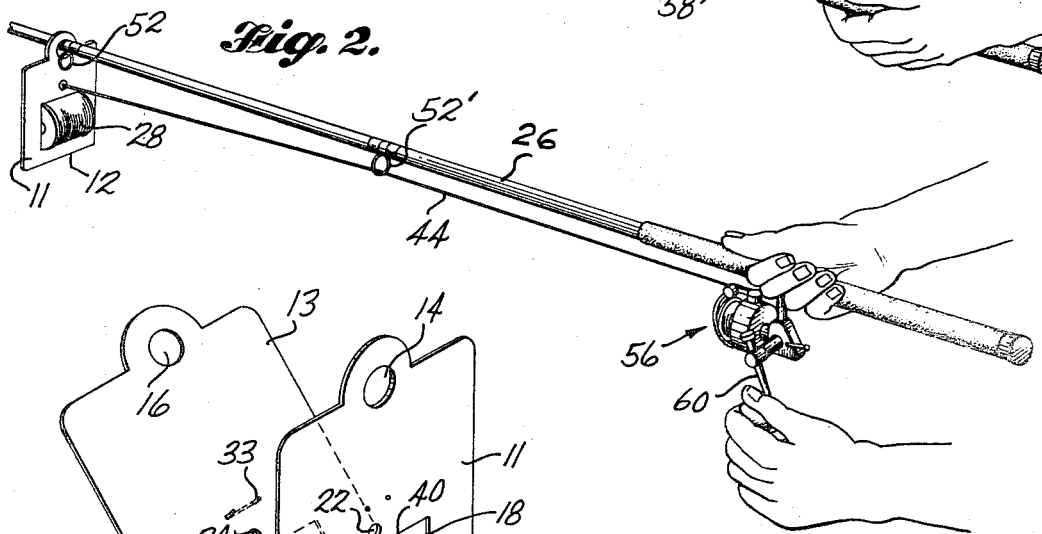
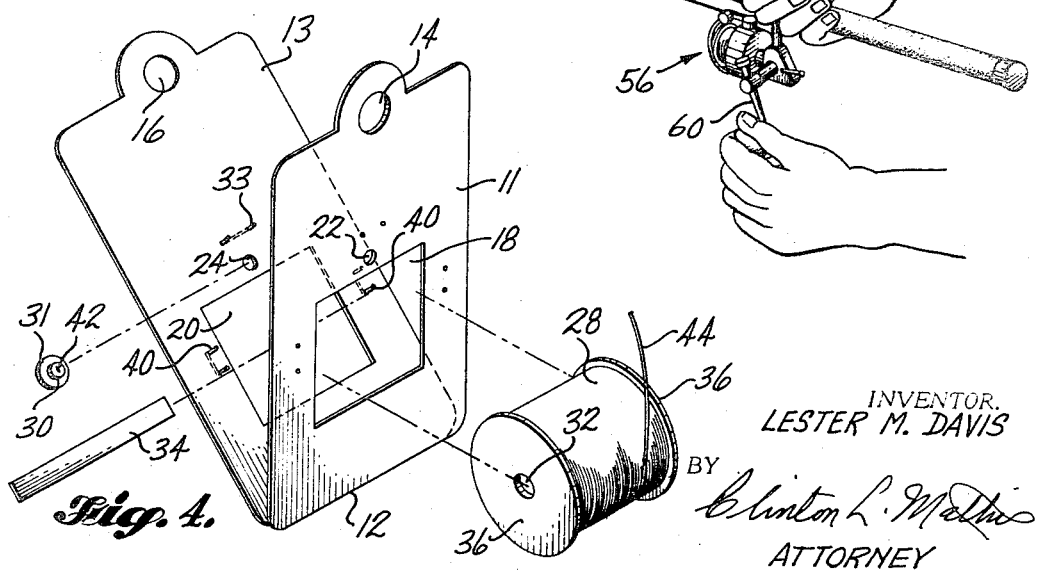
INVENTOR.
LESTER M. DAVIS
BY
Clinton L. Mathis
ATTORNEY Sept. 24, 1968

L. M. DAVIS 3,402,501

FISHING LINE DISPLAY AND DISPENSER

Filed June 28, 1966

INVENTOR.
LESTER M. DAVIS
BY
ATTORNEY

United States Patent Office 3,402,501
Patented Sept. 24, 1968

3,402,501
FISHING LINE DISPLAY AND DISPENSER
Lester M. Davis, Gig Harbor, Wash., assignor to Les Davis Fishing Tackle Co., Tacoma, Wash., a corporation of Washington
Filed June 28, 1966, Ser. No. 561,225
9 Claims. (Cl. 43—25.2)

My invention relates to a fishing line display and dispenser. More particularly, my invention relates to a unique packaging and display dispenser mounting a rotatable spool of fishing line. The said display dispenser is particularly advantageous in the display marketing of fishing line, factory wound on spools and the transfer of such line to the reels of fishing rods, and in a line non-twisting manner.

It is common today to use fishing lines of monofilament nylon. Fishing line cannot be satisfactorily removed from a supply spool by passing loops of the material over the ends of the supply spool. Monofilament nylon requires most exacting techniques in unloading the spools. The supply spools must be rotated during unwinding thereof and in the feeding of the said fishing line to the reel on a fishing rod.

Also, today it is becoming more common to sell fishing line in large quantity on a supply spool, so that a plurality of fishing reels on fishing rods may be filled or furnished with the desired amount of line, all from one original supply spool.

Another object of my invention is to provide a fishing line display and dispenser which combines the features of a good display article for pegboards or counter display and with a practical dispenser unit for a spool carrying sufficient quantity of line to fill a plurality of fishing reels.

It is also an advantage of my invention to provide a dispenser having sufficient space for good impact printed advertising on both exposed surfaces of the dispenser and preferably in a form so that all of the printing can be accomplished by one travel of the card through a printing press.

Another object of my invention is to provide a dispenser that can be suspended from a fishing rod and the fishing line dispensed from the supply spool directly onto the fishing reel on the fishing rod wherein the line is under continuous tension to be properly reeled onto the fishing reel and at the same time where the supply spool is limited in free rotation so that there will be no loose fishing line in the area of the supply spool.

Another object of my invention is to create a relatively inexpensive friction or drag to the supply spool, to limit free movement thereof, by rubbing the supply spool against the dispenser during unreeling or dispensing of the fishing line from the supply spool.

Other objects of my invention are to provide a relatively flat sheet having two openings therein, one functioning to suspendedly support the dispenser from a fishing rod and the other, in combination with a cross shaft, to function as a rotatable support for a supply spool of fishing line.

Another object of my invention is to provide such a flat sheet made from an inexpensive material, such as but not limited to cardboard, and preferably to provide the same in an elongated strip so that the said cardboard strip may be folded centrally and crosswise of its longitudinal length and thus provide a flat sheet formed of two plies. Thus, both of the exposed surfaces of the two-layer sheet may be printed at one time to provide desired display and printed surfaces and with a minimum printing cost.

Next, it is an object of my invention to provide a cross shaft on which the supply spool of fishing line is supported for rotary movement and which may be in the nature of a cross shaft of a rectangular piece of flat material, such as cardboard, and which is merely stapled to the flat sheet, and between the layers thereof, for mounting.

Another object of my invention is to provide a drag or frictional brake preventing free movement of the supply spool and minimizing of loose fishing line at or leaving the said spool.

Another object of my invention is to provide a tension member carried by the flat sheet and having an opening therein to snugly receive the fishing line from the supply spool so that the fishing reel on the fishing rod is fed with fishing line under desired tension providing fishing line, on the fishing reel on the fishing rod, that is ready for use in fishing.

In a general way, it is an object of my invention to provide a fishing line display and dispenser which is economical to produce; is practical for display and sales purposes; provides sufficient surface area for printed sales and use information; and provides a needed article to the ultimate buyer, the fisherman, who needs a device to transfer from one to several hundred yards of fishing line directly from the supply spool to his fishing reel in the easiest, safest and most practical manner.

The above mentioned general objects of my invention, together with others inherent in the same, are attained by the structure illustrated in the accompanying drawings, throughout which like reference numerals indicate like parts:

FIGURE 1 is a perspective view of a device embodying my invention;

FIG. 2 is a perspective view of a device embodying my invention mounted on a fishing rod (portions thereof being broken away) and which rod mounts a fishing reel of the spinning and spin-casting type;

FIG. 3 is a view similar to FIG. 2 but showing an ordinary reel mounted on the fishing rod;

FIG. 4 is a perspective exploded view of a device embodying my invention;

Figure 5:
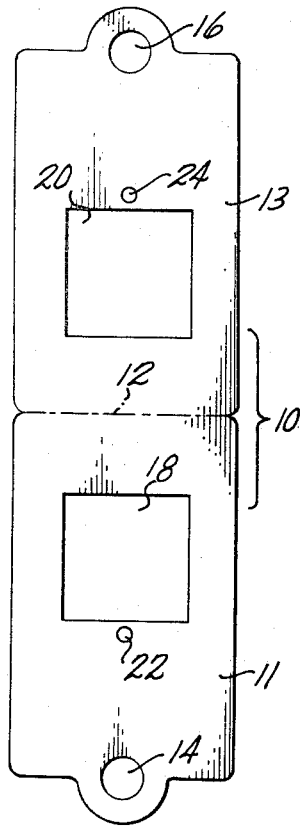
FIG. 5 is a plan view of a cut blank sheet, before folding, employed in my invention.

In the drawings, an elongated piece of flat material 10 (see FIG. 5) is employed, and for economical reasons the same may be formed of cardboard. However, other materials, including but not limited to plastic sheets, may be employed if desired. Such piece of material is folded along a transverse line 12 to provide a single flat sheet formed of two layers, a front layer 11 and a back layer 13 (see FIGS. 4 and 1). Such sheet will have the desired strength because of such multiple layers (11 and 13) and with the aditional advantage that the outside surface of each layer 11 and 13 of the final sheet may have printed matter thereon obtained by one passage of a sheet through a printing press. At one time, before folding, both said outside surface of the completed sheet of multiple layers were in a common plane (as shown in in FIG. 5), so that printing on both such outside surfaces could be accomplished with one such passage. By having both outside surfaces of final sheet 11–13 printed at one time, the outside surfaces of both layers 11 and 13 are available, at a minimum cost, as a carrier for advertising and instructions. However, if such cost advantages may be ignored, a single sheet of cardboard of suitable weight, or of other suitable material, as a plastic, may be employed in utilizing my invention.

At the time the carboard sheet 10 is cut to desired dimension from stock, then holes 14, 16, 18, 20, 22, and 24, may be punch cut, along with the punch cutting of the marginal edge portions of the elongated piece of flat material 10, by a suitable punch press.

When cutting said holes in said piece of flat material 10 (see FIG. 5), the holes 14 and 16 are symmetrically positioned relative to each other and to the transverse fold line 12, the holes 18 and 20 are likewise similarly symmetrically positioned, and the holes 22 and 24 are likewise, similarly symmetrically positioned, so that upon folding of the piece of cardboard 10 along the said transverse fold line 12 (see FIGS. 4 and 1), the holes 14 and 16 will be in registration and provide a single hole 14–16. This hole 14–16 will function as a supporting means, carried by said folded cardboard, to suspendedly support the completed fishing line display and dispenser for sales purposes from a pegboard and for use from an object placed through said hole 14–16, preferably the fishing rod 26.

When so folded along said transverse fold line 12, the back surfaces of the front layer 11 and the back layer 13 will be in contact. The front surfaces of said front layer 11 and the back layer 13 will be exposed and form the exposed front and back surfaces of the multiple-ply flat piece of material 11–13. At the same time the holes 18 and 20 will be in registration and form a common rectangular opening 18–20 and of a size to permit a supply spool 28 of the fishing line to be mounted in said common rectangular opening 18–20. Also, the holes 22 and 24 will be in registration to provide a common hole 22–24. A tension member 30–31 comprises a relatively large washer 31 and an integral washer 30. The washer 30 is of a size to be inserted and snugly interfittted with the hole 22 in the front layer 11. The washer 31 is too large to pass through either hole 22 or 24 and is positioned between layers 11 and 13. One of the functions of staple 33 is to secure layers 11 and 13 together at the area of tension member 30–31 and because of the size of washer 30 to prevent displacement of said tension member 30–31. Thus, the tension member 30–31 has a portion 30 thereof inserted in said opening 22 to snugly fit and be retained therein, mounted thereby and carried by the flat sheet 11–13, and disposed relatively above, and centrally of, the common rectangular opening 18–20.

It is common practice, in the packaging of fishing line for sale, to wind fishing line upon a supply spool, as spool 28, and which supply spool is provided with an axially directed hollow center shaft 32 and I utilize such center shaft 32 in my invention, by mounting the same one a cross shaft 34 carried by the sheet 11–13. The said cross shaft 34 is preferably a rectangular flat sheet of material to facilitate its fastening to the sheet 11–13. Preferably said cross shaft 34 is inserted part way between the layers 11 and 13 and the supply spool 28 is inserted into the opening 18–20. Then the said cross shaft 34 is fed through the center of the hollow center shaft 32 and thence outwardly and between the layers 11 and 13 on the other side of the supply spool 28 (see particularly FIG. 4).

Figure 6:
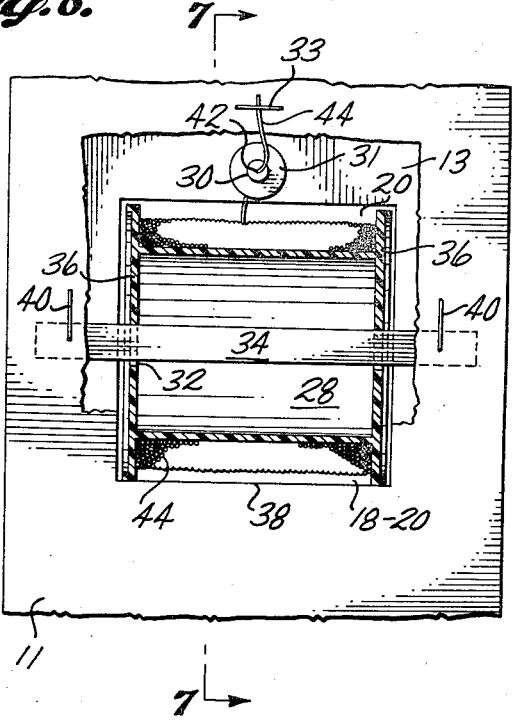
FIG. 6 is a fragmentary elevational view with parts broken away showing details at the area of a mounted spool of fishing line utilized in my invention.
Figure 7:
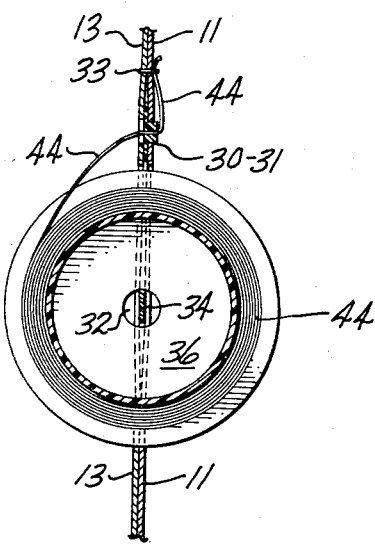
FIG. 7 is a sectional view taken substantially on broken line 7—7 of FIG. 6.

Then the sheet 11–13 is placed substantially in a vertical position and the cross shaft 34 lifted so that it will support the supply spool 32 with the peripheral portions of the end walls 36 in contact with the lower wall 38, which is one of the walls forming hole 18–20 (see FIG. 6). At this time staples 40 are applied securing the layers 11 and 13 to the end portions of the cross shaft 34. With the cross shaft so mounted between the layers 11 and 13, the package has a neat and desirable appearance, any printing on either of the exposed surfaces of the layers 11 and 13 is not covered and thus marred from an appearance standpoint, and the end portions of the cross shaft 34 are covered and protected against wear.

Thus, the said cross shaft 34 mounts the fishing line supply spool 28, carrying fishing line thereon, for rotary motion and by the positioning of said cross shaft 34 relative to the wall 38, and then securing such position by stapling, I provide a drag against free rotation of the fishing line supply spool and minimize loose fishing line at the area of the said spool 28. While a drag between the supply spool 28 and the member 11–13 may be accomplished by contacting other areas of the end walls 36 and member 11–13 or by increasing contact between cross shaft 34 and member 11–13, I prefer the form of drag illustrated and described.

The supply spool 28 is mounted so that the fishing line, leaving the same, may be pulled upwardly of the back layer 13 and in a direction toward the tension member 30–31. Such tension member 30–31 is composed of relatively resilient material, such as a soft plastic or rubber, and has an opening 42 therein extending from the front to the back of the tension member 30–31. Preferably, the openings 22–24 are round and the external contour of the washer 30 mates with the hole 22 to provide for easy manufacture of parts and ready insertion and retention of the tension member 30–31 in place. The size of hole 42 is selected to provide desired friction on fishing line 44 passing therethrough and passing through hole 24.

The fishing line 44 leaving the back side of the spool 28 (the side protruding from back layer 13) is drawn upwardly and through the opening 42 in the tension member 30–31 and outwardly to the front of the dispenser (outwardly from front layer 11) and as a convenience in shipping, the staple 33 is also employed to secure the free end of the line 44 to the front layer 11. The end of line 44 is removed from under staples 33 before dispensing fishing line from spool 28. The hole 22–24 is preferably located substantially centrally of the supply spool 28 so as to provide for a relatively uniform feed distribution of fishing line from the supply spool 28 as the fishing line is being delivered from said spool 28 to and through the opening 42 in the tension member 30–31. Also, the tension member 30–31 is positioned above the supply spool 28. In originally winding fishing line on the supply spool 28, the manufacturers commonly place the fishing line thereon in layers where one layer starts at one side and adjacent one of the end walls 36 and provides one layer across the spool 28 to the other end wall 36 and thence back to the first mentioned end wall with a second layer. This is continued until many layers of fishing line are wound on the supply spool 28 (much like a spool of thread). Thus, in removing the fishing line from such a supply spool 28, there is smoother unwinding of the fishing line from said supply spool if the said tension member 30–31 is disposed relatively centrally of the length of the layers of fishing line on the supply spool 28.

In utilizing my invention, the device is secured to a fishing rod 26 by sliding the hole 14–16 over the tip end portion (not shown) of the fishing rod 26 and over line guides until my device reaches a guide 52 which it will not pass. Then the upper of the surface portions forming the hole 14–16 will rest upon the fishing rod 26 and behind a line guide 52 (see FIGS. 2 and 3) and with the device suspendedly supported by the fishing rod and hanging down below the fishing rod 26 when the latter is placed in substantially a horizontal position. The fishing line 44, leaving the tension member 30–31, is fed substantially parallel to the rod 26 and through a line guide 52' on the fishing rod 26 and is engaged to fishing reel means, as 58 of FIG. 3 or 56 of FIG. 2.

In FIG. 3 the line 44 is engaged to the rotatably mounted reel 54 of the reel means 58 mounted on the fishing rod 26. In FIG. 2 the line 44 is fed by a rotatable finger (not shown but conventional on reel means of the spin-cast or spinning type) onto a non-rotatably mounted reel. Devices of my invention may be utilized in the threading of fishing line on the rotatable or non-rotatable reels of fishing reel means. In FIG. 2, I have shown the reel 56 of the spin-cast or spinning type and in FIG. 3, I have shown the reel 58 of the general type. Both reel types have reels onto which fishing line 44 may be fed. Spinning reel 56 has a crank 60 designed to be operated by the fingers of the left hand of a user as most fishing rods carrying a spin-cast reel are designed to be carried and cast by the right hand of the user and with the left fingers of a user providing the turning motion of the rotatable finger (not shown) for disposing fishing line 44 on the reel when fishing line is reeled in.

As the crank 60 of reel 56 or crank 62 of reel 58 is turned in a direction to reel in or place fishing line on a fishing line reel, the fishing line 44 should be under desired tension so that the fishing rod, reel, and line are in condition for immediate fishing use, without further reeling or manipulation of the fishing line. This requires a tension between the supply spool 28 and the fishing line reel, which is accomplished by the tension member 30–31. Thus, a fisherman can load a reel with fishing line under tension and in a condition ready for fishing. At the same time while the fisherman is turning a crank, as 62, in the desired direction to move fishing line under tension to the rotatable reel 54, the drag provided between the end walls 36 and the layers 11–13 will prevent the supply spool 28 from continuing to turn after force is removed from the crank 62 even though such force is suddenly stopped. This, of course, prevents snarling and excess fishing line between the supply spool 28 and the tension member 30–31.

Devices of my invention facilitate the sale of fishing line in relatively large quantity, as by the weight of the fishing line, and thus if a 12-pound test nylon line is sold in an amount, such as one-quarter pound net weight, the approximate length of the fishing line will be around 1100 yards. Thus, my invention lends itself to the sale of substantial quantities of fishing line, which may be used by the fisherman in very small quantities to provide merely a leader or in large quantities to provide a supply which will fill a plurality of fishing reels. The fishing line on the supply spool 28 must be maintained in a condition so it may be utilized from time to time by a fisherman and with complete safety against the fishing line being twisted, snarled, and the like, which may weaken and thus ruin the fishing line for its intended purpose.

In general, it will now be apparent that I have provided a flat sheet 11–13 having supporting means disposed in an upper end portion thereof, illustrated by the hole 14–16, for suspendedly supporting the said flat sheet 11–13 and parts carried thereby from any suitable support (as a pegboard) for display and from a fishing rod (when my device is in use). Further, I have illustrated and described a rectangular opening 18–20 in a lower end portion of the sheet 11–13. Next, I have provided a cross shaft 34, which extends crosswise of the rectangular opening, which is secured to said sheet 11–13, and which rotatably mounts a fishing line supply spool 28, and which is mounted to provide a drag between the fishing line supply spool 28 and the sheet 11–13. Next, I have provided a tension member 30–31 supported by said sheet 11–13 and creating tension on fishing line 44 as the same leaves said tension member 30–31. As a specific embodiment of a drag between the supply spool 28 and the sheet 11–13, I have indicated means to drag or frictionally engage the end walls 36 of the spool 28 with the bottom marginal portion of the sheet forming the hole 18–20.

Next, I have provided an elongated piece of flat material and which is folded along a transverse fold line 12 to provide a sheet of multiple layers 11–13. Before folding, the said elongated sheet 10 has holes 14, 16, 18, 20, 22, and 24, inclusive, as well as the marginal portions and the printing completed for the various reasons set forth in the foregoing. With such a folded sheet 11–13, the cross shaft 34 may be made of a flat rectangular piece which can be readily stapled between the two layers 11 and 13 and readily mounted in a position to provide for desired drag between the spool 28 and the sheet 11–13 and at the same time the ends of the cross shaft are protected by being disposed between said layers and the said cross shaft does not mar or disfigure any printing on the outside surfaces of the sheet 11–13. Next, I have provided a tension member 30–31 which is readily mounted and positioned on the sheet 11–13 to ensure desired tension on fishing line leaving said tension member 30–31. When in use, the said sheet of material 11–13 can be readily suspendedly by a fishing rod 26 and thus the fishing line can be readily threaded from the device through a line guide 52' of the fishing rod and thence directly onto the reel means of a fishing reel carried by a fishing rod 26. Other details regarding my invention are set forth previously and the foregoing serves only as a general outline but not a limitation.

Obviously, changes may be made in the forms, dimensions, and arrangements of parts of my invention, the above setting forth only preferred embodiments of my invention.

I claim:

1. A fishing line display and dispenser comprising a flat sheet having supporting means disposed at an upper end portion thereof for suspendedly supporting the same from a fishing rod and in a substantially vertical plane and having a rectangular opening in a lower end portion thereof; a cross shaft extending crosswise of said rectangular opening and secured to said flat sheet; a fishing line supply spool carrying fishing line thereon mounted for rotary motion on said cross shaft; and a tension member carried by said flat sheet and having an opening therein to snugly receive said fishing line leaving said supply spool and passing through said opening in said tension member.

2. The combination of claim 1 wherein the fishing line supply spool is mounted to frictionally engage said flat sheet to provide a drag against free rotation of the fishing line supply spool and minimizing of loose fishing line between the spool and the tension member.

3. The combination of claim 1 wherein the fishing line supply spool is mounted with its periphery in contact with the portion of the flat sheet forming the lower marginal edge portion of the rectangular opening to provide a drag against free rotation of the fishing line supply spool and minimizing of loose fishing line between the spool and the tension member.

4. A fishing line display and dispenser comprising an elongated piece of cardboard having a front surface and a back surface, said piece of cardboard having two longitudinally spaced apart substantially rectangular openings symmetrically located in said piece of cardboard, said piece of cardboard being folded along a transverse line with the two portions so formed disposed with opposite end portions of the said back surface in contact and with the portions of the front surface exposed and with the two rectangular openings in registration to form a common rectangular opening; a cross shaft comprising a flat strip extending crosswise of said common rectangular opening, extending substantially centrally of the longitudinal dimension of said opening, and secured at its ends to said piece of cardboard; a fishing line supply spool carrying fishing line thereon mounted for rotary motion on said cross shaft; a tension member carried by said piece of cardboard and having an opening therein to snugly receive said fishing line leaving said supply spool and to frictionally resist travel of fishing line after passing through said opening in said tension member; and supporting means carried by said folded cardboard to suspendedly support the same in a substantially vertical plane.

5. The combination of claim 4 wherein the fishing line supply spool is mounted to frictionally engage the marginal portions of the piece of cardboard forming the common rectangular opening to provide drag against free rotation of the fishing line supply spool and lessening of loose fishing line between the spool and the tension member.

6. The combination of claim 4 wherein the longitudinal dimension of said common rectangular opening is longer than the largest diameter of said fishing line supply spool and when said folded piece of cardboard is suspended substantially vertically with the fishing line supply spool mounted thereon, the said cross shaft is positioned longitudinally relative to the cardboard edge forming the then lower marginal edge of the common rectangular opening to provide contact between said edge and said spool and to provide a drag against free rotation of the fishing line supply spool and lessening of loose fishing line between the spool and the tension member; and wherein the opening in the tension member is alined substantially midway of the length of the fishing line supply spool.

7. The combination of claim 4, wherein the means to suspendedly support said folded cardboard comprises an end portion having an opening therein adapted to receive a fishing rod.

8. The combination of claim 4, wherein the cardboard strip forming the cross shaft is mounted between the two back surfaces of the elongated piece of cardboard after the cardboard has been folded.

9. The combination of claim 4, wherein printed matter placed at any desired location on the front surface of the elongated piece of cardboard will be visibly exposed after said elongated piece of cardboard has been folded with the opposite end portions of the back surface thereof in contact.

References Cited
UNITED STATES PATENTS

| | | | |
|---|---|---|---|
| 1,387,299 | 8/1921 | Oliver | 242—129.62 |
| 2,899,148 | 8/1959 | Brainard | 242—129.8 |
| 2,993,661 | 7/1961 | D'Arrigo | 242—106 |
| 3,044,618 | 7/1962 | Surloff | 206—80 |
| 3,298,127 | 1/1967 | Bedell | 43—25.2 |

SAMUEL KOREN, *Primary Examiner.*

D. J. LEACH, *Assistant Examiner.*